Figure 1:
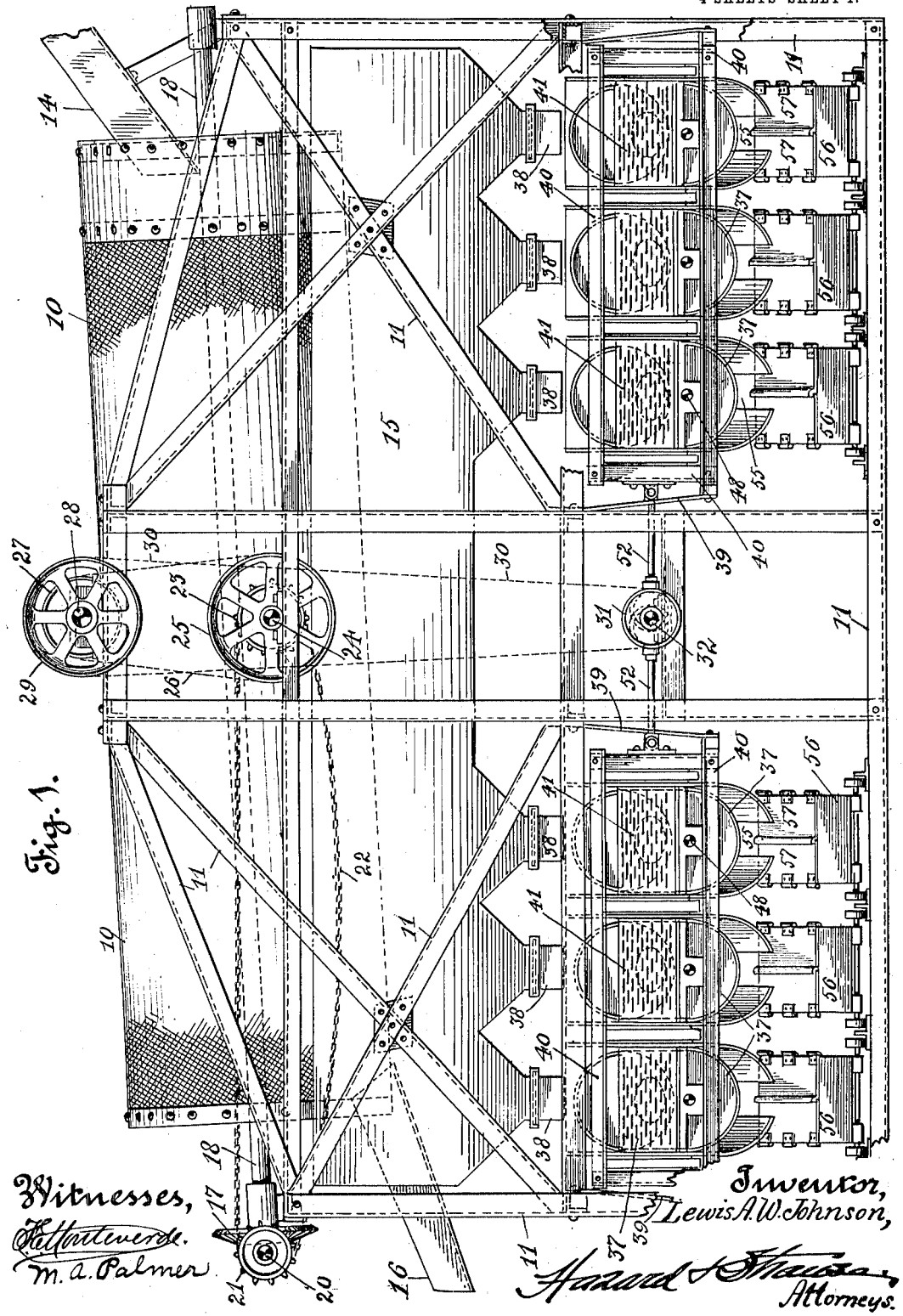

L. A. W. JOHNSON.
DRY CONCENTRATOR.
APPLICATION FILED JULY 31, 1909. RENEWED MAR. 18, 1912.

1,105,977.

Patented Aug. 4, 1914.

4 SHEETS—SHEET 1.

Witnesses,
Inventor,
Lewis A. W. Johnson,
Attorneys.

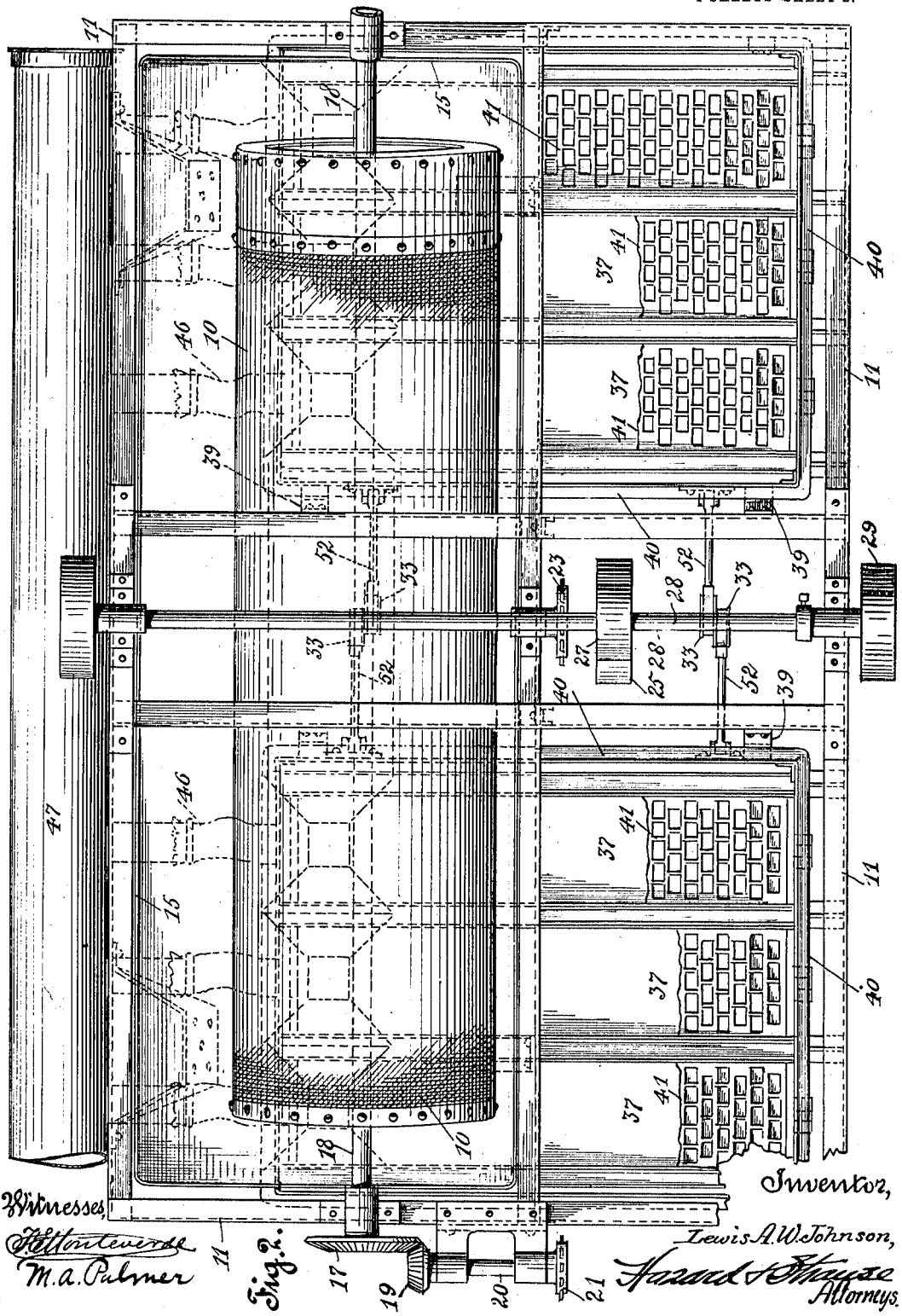

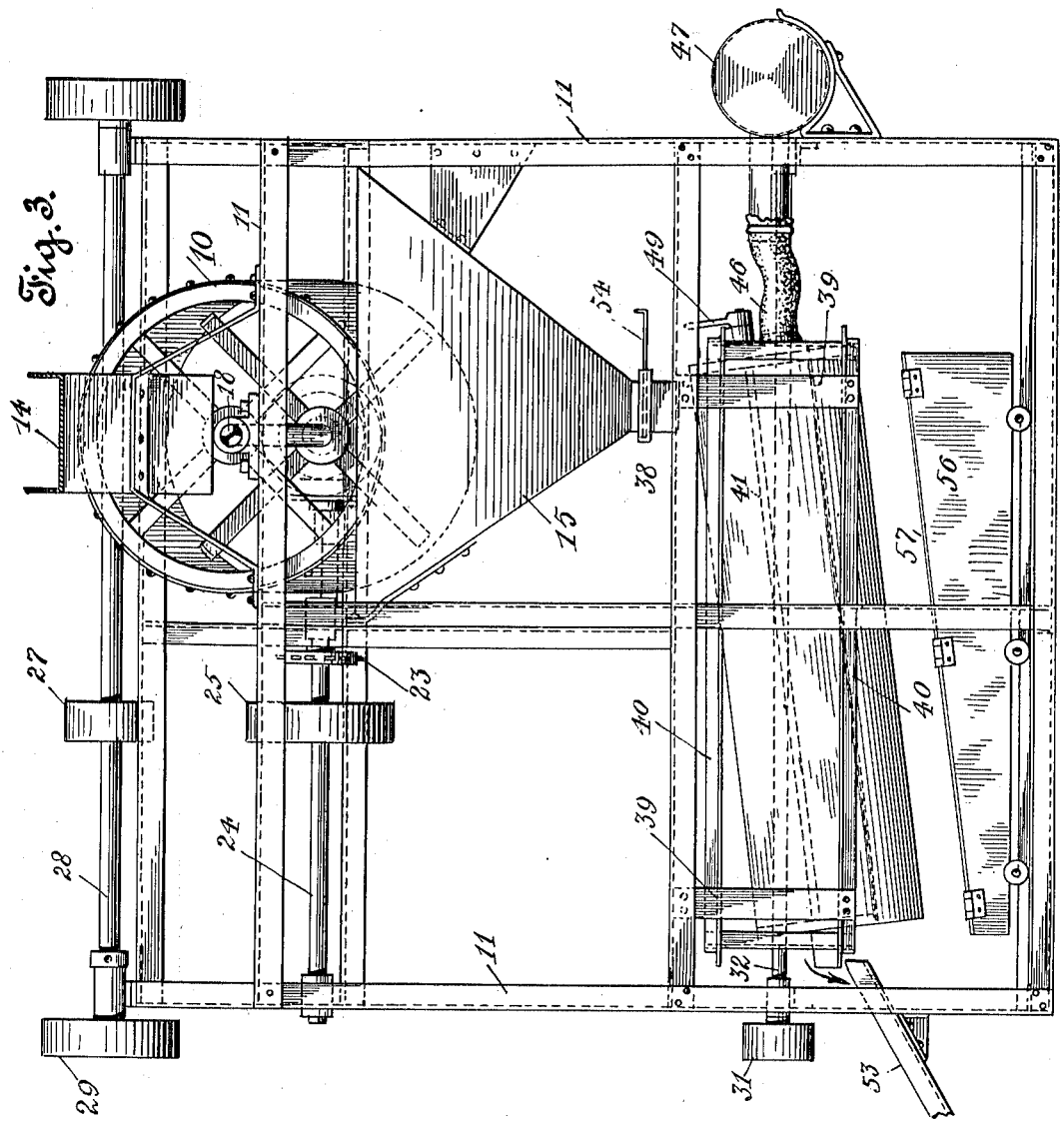

L. A. W. JOHNSON.
DRY CONCENTRATOR.
APPLICATION FILED JULY 31, 1909. RENEWED MAR. 18, 1912.
1,105,977.
Patented Aug. 4, 1914.
4 SHEETS—SHEET 4.
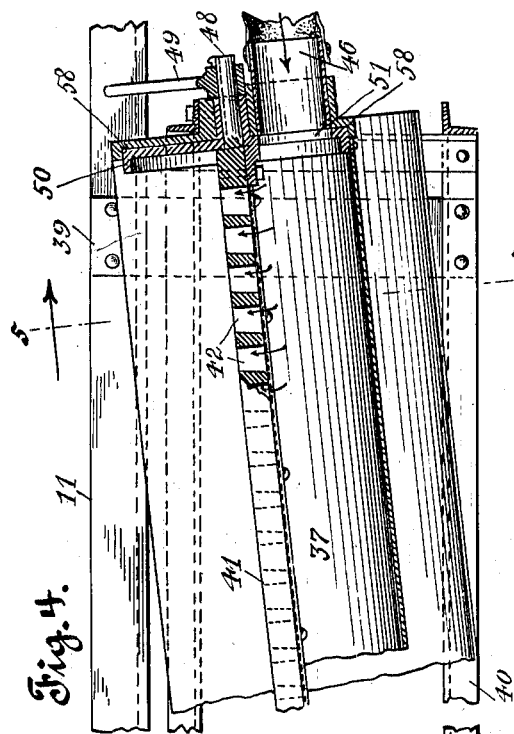
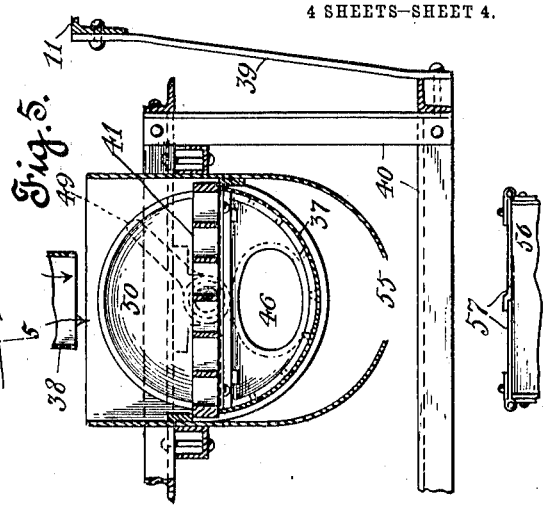
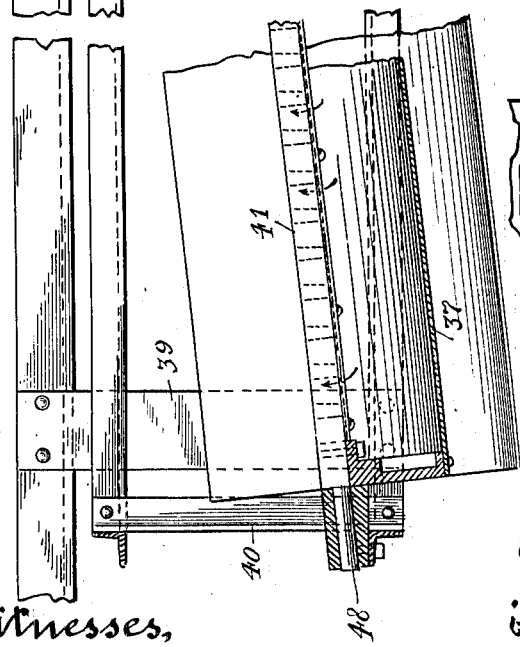
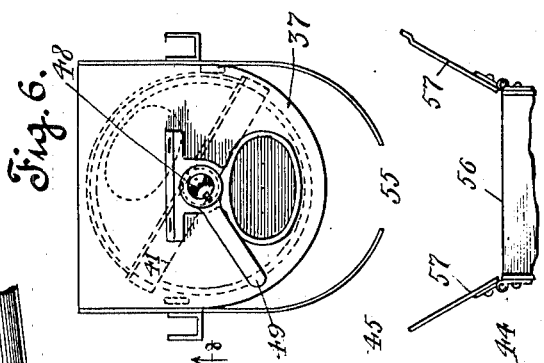
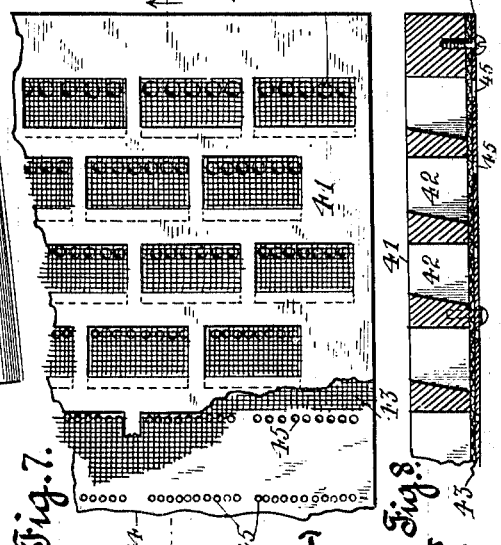
Witnesses,
Inventor,
Lewis A. W. Johnson,
Attorneys.

UNITED STATES PATENT OFFICE.

LEWIS A. W. JOHNSON, OF LOS ANGELES, CALIFORNIA.

DRY CONCENTRATOR.

1,105,977.  Specification of Letters Patent.  Patented Aug. 4, 1914.

Application filed July 31, 1909, Serial No. 510,516. Renewed March 18, 1912. Serial No. 684,622.

*To all whom it may concern:*

Be it known that I, LEWIS A. W. JOHNSON, a citizen of the United States, residing at Los Angeles, in the county of Los Angeles and State of California, have invented new and useful Improvements in Dry Concentrators, of which the following is a specification.

This invention relates to a simple apparatus for the separation of gold or other precious metals from the different substances in which they are found by means of an air blast, in combination with a plurality of concentrating tables having concentrating pockets.

In this invention, by the use of a series of perforations placed close together, the air is blown up through the riffle bed in a multiplicity of small, independent streams, which allow the precious metal to drop down between the perforations whence said streams issue and fall into the pockets. Hence the riffle bed is, during operation of the blast, covered with tiny streams of ascending and descending material presenting somewhat the appearance of the surface of boiling water.

A different and less satisfactory result is secured in machines wherein the air is led through slots and rises in unbroken sheets, for the reason that, in the latter instance, the lighter portions of the precious metals will be carried off and lost, instead of falling into the spaces between the perforations of each row.

It will be observed that the oscillation of the riffle bed is in the direction of the length of the rows of perforations, so that all of the material being treated is exposed to the ascending blast of air, notwithstanding the imperforate portions of the bed between the perforations of each row.

A further object of this invention is to provide improved means to discharge the concentrates from the concentrating table after the precious metal has been separated from the substance in which it is found.

My invention, hereinafter described, is shown in the accompanying drawings, in which:—

Figure 1— is a side elevation of a gold separator embodying my invention, parts being broken away. Fig. 2— is a plan view of the same, parts being broken away. Fig. 3— is an end elevation. Fig. 4— is a longitudinal section, partly broken away, of one of the concentrating troughs with concentrating table having pockets therein. Fig. 6— is a cross section of a concentrating trough and plate, taken on line 5—5 of Fig. 4, showing the trough in its upright or operative position, with a fragmentary portion of the truck with its lids closed. Fig. 6— is a rear elevation of the concentrating trough and table, with a fragmentary portion of a removing truck with the lids open for the reception of the concentrates in its inverted or dumping position, in dotted lines. Fig. 7— is a broken detail plan of the concentrating table or plate. Fig. 8— is a sectional elevation of a concentrating plate, taken on line 8—8 of Fig. 7.

My concentrator consists essentially of a longitudinal rotating cylindrical screen 10, open at both ends and revolubly mounted in the frame 11. The cylindrical screen has, as shown in Fig. 1, an inclination downwardly from the rear to the front end, so that the material to be separated passes into the cylinder at its upper or rear end through the feed chute 14; from thence the particles move downwardly toward the front and the particles will pass through the screen into the V-shaped receptacle or receiver 15 situated below, and such material or particles as are too large to pass through the openings in the cylindrical screen pass out at the front through the discharge chute 16, and are thence conveyed away as waste material to the dump.

Rotary motion is imparted to the cylindrical screen 10 through the bevel gear 17, keyed on the shaft 18 which carries the screen. The gear 17 meshes with bevel gear 19 (Fig. 2) mounted on the shaft 20 which also carries on its other end a sprocket 21. A sprocket chain 22 (Fig. 1) extends from the sprocket 21 to the sprocket 23 keyed on the shaft 24. Keyed also on the shaft 24 is a pulley 25 and extending upwardly from this pulley is a driving belt 26 (Fig. 1) which is carried by a pulley 27, keyed to the counter-shaft 28, revolubly mounted in bearings above the shaft 24. On this counter-shaft 28 (Fig. 2) is also keyed a pulley 29, which is connected by a belt 30 with pulley 31 which is keyed on the cam shaft 32. This cam shaft carries four cams 33. These cams afford means to impart a reciprocating motion, on rotation of shaft 32, to the concentrating troughs 37, six in number, disposed below the cylindrical screen 10, and transversely thereto. These troughs are mounted on two supplementary trough supporting frames 40, operatively connected with the cams or eccentrics 33 by the connecting arms 52 by means of which a reciprocating motion is imparted to the troughs, the troughs being secured to the flat springs 39, which permit a rocking or reciprocating motion of the frame 40. The screened material will drop centrally into the concentrating troughs through the discharge chutes 38 on the bottom of the V-shaped receptacle 15 and onto the concentrating tables 41. The concentrating troughs are divided into an upper and lower part by concentrating tables, which extend the entire length of the troughs and from side to side thereof. (The construction of these troughs is shown in detail in Figs. 4 to 8 inclusive). These tables are riddled with a series of perforations 42, on the bottom of which is disposed a perforated screen or mesh 43 fine enough to prevent the passage therethrough of the smallest particles of precious metals, and immediately below this screen is a plate 44 having perforations 45 for the passage therethrough of air. Air is admitted into the lower compartment of the concentrating troughs through the ports 46, the same being in communication with a supply of air under pressure, which is fed to these troughs by means of the air pipe 47, the only outlet for the air being through the perforations 45, which will cause all the air to pass upwardly through the bottom of the pockets. The bottom plates 44 are provided with a row of perforations 45 disposed, so as to bring these perforations at the top part of the bottom of the pocket, the larger perforations being disposed below the upper pockets and decreasing in size, as shown in Fig. 7, until the lower pockets are reached, the purpose of which is to force a larger volume of air through the upper pockets, and thus impart a greater concentration at this point than if the perforations were of uniform size beneath the alternate rows of pockets disposed in the concentrating plate. The perforations in the lower series of pockets are so small that the velocity or power of the air is not capable of removing the fine powdered gold or values therefrom, and thereby prevent the same from passing outwardly into the waste to the dump and be lost. These troughs are pivotally mounted on a rotatable shaft 48, a crank 49 being carried on the outer end of the trough, and by means of which the trough can be rotated or turned upside down. In Fig. 5 the trough is shown in transverse vertical section in its upright operative position. On the upper end of the trough a circular head 50 is mounted through which is formed an opening 51 of a size and configuration to register with the air inlet port 46, and permit the air to pass from the air reservoir into the lower compartment of the concentrating troughs when the troughs are in their upright position. The troughs are riveted or secured in air tight engagement to the circular heads 50, so as to prevent any air entering the lower part of the trough from passing out, except through the perforations 45 in the plate, and it will agitate any material in the pockets. The heads are mounted in a circular seat 58 in the bottom of which is an opening of a size and configuration similar to opening 51 in the head 50 of the trough, and adapted to register with opening 51 when the trough is in its upright position, and on the rotation of the trough will bring the upper and closed part of the head opposite the opening 51 and shut off the air from the air supply.

The material operated upon drops down through the V-shaped trough 15 and out through the discharge chutes 38 into the concentrating troughs upon the concentrating table therein, and the precious or heavy metals will pass into the perforations or pockets 42 where they will encounter a current of air passing up through the perforations in the plate below, and the lateral or reciprocating motion imparted to the trough on the rotation of the cam shaft 28 will thoroughly agitate the material on the concentrating table, the concentrating tables being operatively connected to the cam shaft by the eccentric rods 52 will impart a reciprocating vibratory motion to the concentrating tables and agitate the material therein contained, and the air blast being passed through the bottom thereof upwardly will prevent anything but the heavy and valuable particles from remaining in the pockets. This constant reciprocating movement, together with the air blast will cause the worthless material to pass downwardly over the concentrating table out of the trough and be dumped upon the delivery chute 53, whence the particles will pass out of the concentrator. The openings through the various chutes 38 leading from the V-shaped trough or receptacle 15 are regulated by the valve 54. Now when the pockets in the concentrating tables are sufficiently full of concentrates, the troughs are thrown from their upright position, as shown in Fig. 5, to their inverted position, as shown in Fig. 6. This is accomplished manually by means of the lever 49. When the concentrating tables are in the inverted or discharging position, as shown in dotted lines in Fig. 6, their contents will drop downwardly and out through the opening 55 and pass into the boxes 56 disposed below the concentrating troughs, whence they can be removed where desired. A fragmentary portion of these boxes is shown in Figs. 5 and 6. In Fig. 5 the lids 57 are shown in their closed position, and in Fig. 6 they are shown in their open position.

The arrangement described for dumping the troughs by rotating them is advantageous because of the dumping throughout their entire length and not at the lower end where the discharge of the gangue usually takes place. In this way the trough 53 over which the gangue passes does not interfere with the receptacles for catching the concentrates.

Having described my invention what I claim as new and desire to secure by Letters Patent is:—

In a separator, in combination, an elongated trough, a concentrating table mounted to rotate in said trough on the longitudinal axis of said trough, a substantially circular head rigid with said table and having a blast port therein, a seat receiving said head and having a blast opening therein adapted to register with said blast port when said table is in an upright position, and means for rotating said table and said head to throw said port and said opening out of register to cut off the blast and to dump the concentrates from said table, said table having a plurality of concentrating pockets to retain the concentrates, and means for directing the blast upwardly through said pockets.

In witness that I claim the foregoing I have hereunto subscribed my name this 24" day of July, 1909.

LEWIS A. W. JOHNSON.

Witnesses:
 EDMUND A. STRAUSE,
 MYRTLE A. PALMER.